United States Patent [19]
Kurtzman, II et al.

[11] Patent Number: 6,144,944
[45] Date of Patent: Nov. 7, 2000

[54] COMPUTER SYSTEM FOR EFFICIENTLY SELECTING AND PROVIDING INFORMATION

[75] Inventors: Stephen J. Kurtzman, II, San Jose; Sandeep A. Nawathe, Sunnyvale, both of Calif.

[73] Assignee: Imgis, Inc., Cupertino, Calif.

[21] Appl. No.: 09/064,675

[22] Filed: Apr. 22, 1998

Related U.S. Application Data

[60] Provisional application No. 60/076,127, Feb. 27, 1998, and provisional application No. 60/044,928, Apr. 24, 1997.

[51] Int. Cl.[7] .................................................. G06F 17/60
[52] U.S. Cl. ................................. 705/14; 705/1; 705/10; 705/26
[58] Field of Search .................................... 705/1, 10, 14, 705/26; 707/102; 709/217, 219

[56] References Cited

U.S. PATENT DOCUMENTS

| | | | |
|---|---|---|---|
| 5,636,346 | 6/1997 | Saxe | 705/1 |
| 5,692,132 | 11/1997 | Hogan | 395/227 |
| 5,710,884 | 1/1998 | Dedrick | 709/217 |
| 5,710,887 | 1/1998 | Chelliah et al. | 395/226 |
| 5,712,979 | 1/1998 | Graber et al. | 395/200.11 |
| 5,717,860 | 2/1998 | Graber et al. | 395/200.12 |
| 5,717,923 | 2/1998 | Dedrick | 707/102 |
| 5,721,827 | 2/1998 | Logan et al. | 395/200.47 |
| 5,724,424 | 3/1998 | Gifford | 380/24 |
| 5,724,521 | 3/1998 | Dedrick | 705/26 |
| 5,727,156 | 3/1998 | Herr-Hoyman et al. | 395/200.49 |
| 5,737,619 | 4/1998 | Judson | 395/761 |
| 5,740,549 | 4/1998 | Reilly et al. | 705/14 |
| 5,751,956 | 5/1998 | Kirsch | 395/200.33 |
| 5,757,917 | 5/1998 | Rose et al. | 380/25 |
| 5,774,170 | 6/1998 | Hite et al. | 348/9 |
| 5,848,396 | 12/1998 | Gerace | 705/10 |
| 5,848,397 | 12/1998 | Marsh et al. | 705/14 |
| 5,933,811 | 8/1999 | Angles et al. | 705/14 |
| 5,948,061 | 9/1999 | Merriman et al. | 709/219 |
| 5,959,623 | 9/1999 | Hoff et al. | 345/333 |

FOREIGN PATENT DOCUMENTS

| | | | |
|---|---|---|---|
| 0 749 081 A1 | 12/1996 | European Pat. Off. | G06F 17/60 |
| WO97/21183 | 6/1997 | WIPO | G06F 151/00 |

OTHER PUBLICATIONS

Gallagher et al., "A Framework for Targeting Banner Advertisement On the Internet", IEEE 1997.

Frook, "Search–Engine Advertising—Web Marketing Push", Communication Week, Oct. 9, 1995.

Wilde, "Enhanced services, partnerships attract users and advertisers . . . ", Communication Week, Issue:614 p. IA01 Jun. 7, 1996.

Cooper et al., "Zooming In On Users—Who buys on the Web? New tools and services tell you that and more.", Communication Week, Issue:649 p. 43 Feb. 10, 1997p□.

Article by Ellis Booker entitled: "Seeing a Gap, A Palo Alto Startup Will Debut Advertising Server for the Net" published by Web Week, vol. 2, Issue 2 in Feb. 1996.

Article by Bob Metcalfe entitled: "From the Ether", Infoworld, V18 issue 3, Aug. 12, 1996.

(List continued on next page.)

*Primary Examiner*—Allen R. MacDonald
*Assistant Examiner*—Jagdish Patel
*Attorney, Agent, or Firm*—Fenwick & West LLP

[57] ABSTRACT

A system for selecting and providing information. The system can include an advertisement server that provides selected advertisements in response to a request from a web page server. The request includes information that will allow the advertisement server to select an appropriate advertisement. The advertisement server includes a control program for controlling the selection of the advertisements. The control program communicates with one or more affinity engines. Each affinity engine determines an affinity (degree of relevance or indicator of matching) given advertisements have for the information corresponding to the request. The engines use different request information such as demographic information, page sponsor information, keyword sponsor information, etc.

20 Claims, 4 Drawing Sheets

OTHER PUBLICATIONS

Net Gravity Announces AdServer 2.0, Oct. 14, 1996, published at http://www.netgravity.com.

Article titled "Internet access: Internet marketing revolution begins in the U.S. this Sep."; Hyper Net Offering on Dec. 1996 EDGE: work–group Computer Report, V7 N316.

Article by Youji Kohda et al. entitled: "Ubiquitous advertising on the WWW: Merging advertisement on the browser" published by Computer Netwrks and ISDN Systems, vol. 28, No. 11, May 1996, pp.1493–14993

Declaration of Dwight Allen Merriman submitted with 37 CFR 1.131 petition during prosecution of U.S. Patent No. 5,948,061.

COMPUTER SYSTEM FOR EFFICIENTLY SELECTING AND PROVIDING INFORMATION

RELATED APPLICATIONS

This application is a continuation of U.S. Provisional Patent Application Serial No. 60/076,127, filed Feb. 27, 1998, entitled "Computer System for Efficiently Selecting and Providing Information," and Provisional Patent Application Serial No. 60/044,928, filed Apr. 24, 1997, entitled "Computer System for Efficiently Selecting and Providing Information," both having inventors Stephen J. Kurtzman II and Sandeep A. Nawathe. Both of the above-identified applications are incorporated herein by reference in their entirety.

This application is further related to U.S. patent application Ser. No. 08/847,778, filed Apr. 24, 1997, entitled "Content Stream Analysis," having inventor Stephen J. Kurtzman II, which application is incorporated herein by reference in its entirety.

THE BACKGROUND OF THE INVENTION

A. The Field of the Invention

This invention relates to the field of computer systems for providing information. In particular, the invention relates to an expandable server for efficiently providing information to clients based on selection criteria.

B. Background Information

Product advertisements in media such as newspaper and television have the advantage of reaching many people. At the same time, these forms of advertisement are indiscriminate and may reach many people who are not interested in the product advertised.

An advertisement is more effective when it can be targeted to a specific market so consumers in that market will be more likely to be interested in the product advertised. For example, advertisements for fishing equipment will be more effective when placed in a fishing magazine. The benefit to the consumers is that they are presented with advertisements that they will find much more useful.

On the World Wide Web (or web), advertisers can target specific markets with more discrimination than other media. The information presented to the user is dynamically generated so advertisers can select an appropriate advertisement in real time for that specific user. Thus, the manner in which content is presented on the web means that advertisers can reach increasingly defined segments of the market. For example, a high percentage of people who access a stock quotes web page may be interested in a stock broker. A stock broker who places an advertisement on this web page may reach a smaller group of people, but a much higher percentage of this group will be potential customers. This is in stark contrast to other media such as newspaper and television, in which the target market may only be a small percentage of the total market reached.

Other media, including emerging and developing technologies such as on-demand television, will also give advertisers similar ability to target specific markets.

To take advantage of this ability to target specific markets on the web, advertisers often estimate a user's interests using a variety of profiling techniques. These profiling techniques can help an advertiser to select an advertisement to present to the user. Current profiling techniques use a combination of demographic, geographic, psychographic, collaborative filtering, digital identification, and hypertext transfer protocol (HTTP) information. The user typically has to enter information about that user, and then the media server uses that information to determine an appropriate advertisement. However, the types of information that are being used by advertisers are constantly changing. Advertisers want a flexible system that will allow them to select various sets of criteria for selecting appropriate advertisements.

Additionally, the selection process has to work in real time. An example of the problem is a user should not have to wait for a web page because the server is still trying to determine an appropriate advertisement.

Additionally, the selection process should be independent of the type of media being served. The system should be flexible enough to serve any type of media e.g., text advertisement, video spot, or Java applet, to any type of dynamically generated information such as a web page, interactive television, etc.

Therefore, what is desired is a flexible, fast, media selection and presentation system.

A SUMMARY OF THE INVENTION

An expandable system and method for efficiently selecting and providing information such as advertisements is described.

In various embodiments of the invention, an advertisement server provides selected advertisements in response to a request from a web page server. The request includes information that will allow the advertisement server to select an appropriate advertisement. The advertisement server includes a control program for controlling the selection of the advertisements. The control program communicates with one or more affinity engines. Each affinity engine determines an affinity (degree of relevance or indicator of matching) given advertisements have for the information in the request. The engines use different request information such as demographic information, page sponsor information, keyword sponsor information, etc.

The engines also weight the advertisements. The engines can use feedback to determine an appropriate number of advertisements to provide from the engine. Administrators can change the weightings of various engines to ensure that the engines get appropriate relevance when generating the lists. Ultimately, the weightings allow the advertisement server to find a best match advertisement(s) for a user. The results of one engine can be fed into the next engine so that a more appropriate advertisement can be found.

Additionally, at any time, the control program can force the delivery of an advertisement prior to the completion of processing by all of the engines. This ensures that some advertisement(s) will be served within the constraints of the web server's response requirements.

Other embodiments of the system provide different types of media for different types of dynamically generated information. For example, in various embodiments, Java applets, dynamic HTML, images, video sequences, and text are served for use in web pages, interactive television, and other forms of dynamically generated information.

Other embodiments of the invention include computer program products that have programs that can select and serve media for dynamically generated information. Examples of the types of computer program product can include CDs, zip disks, hard disks.

Although many details have been included in the description and the figures, the invention is defined by the scope of the claims. Only limitations found in those claims apply to the invention.

A BRIEF DESCRIPTION OF THE DRAWINGS

The figures illustrate the invention by way of example, and not limitation. Like references indicate similar elements.

THE DESCRIPTION

A. System View

Figure 1:
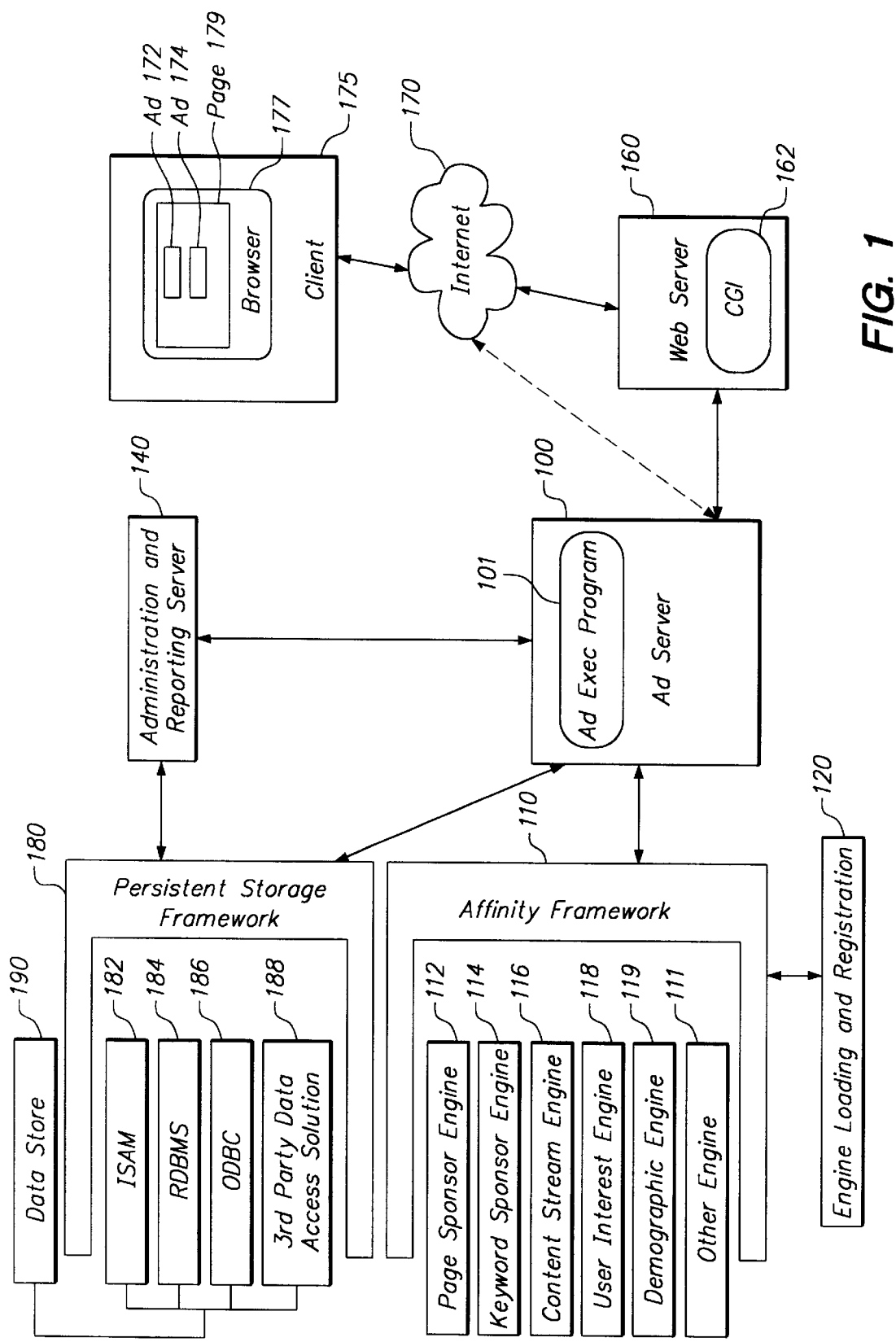
FIG. 1 illustrates a computer system for selecting and serving advertisements.

FIG. 1 illustrates a computer system for selecting and serving advertisements. The following first describes the elements of FIG. 1 and then their connections and operations.

FIG. 1 includes the following elements: a client 175, the internet 170, a web server 160, an ad server 100, an administration and reporting server 140, a persistent storage framework 180, a data store 190, an affinity framework 110, and an engine loading and registration element 120. The client 175 includes a browser 177, which includes a page 179, an ad 174, and an ad 172. The web server 160 includes a CGI 162. The ad server 100 includes an ad exec program 101. The persistent storage framework 180 includes a number of data access modules. The data access modules include an ISAM 182, an RDBMS 184, an ODBC 186, and a third party data access solution 188. The affinity framework 110 has a number of affinity engines registered with the ad server 100. These engines include a page sponsor engine 112, a keyword sponsor engine 114, a content stream engine 116, a user interest engine 118, a demographic engine 119, and an other engine 111.

The following paragraph describes the connections between the various elements of FIG. 1. The client 175 communicates through the Internet 170 to the web server 160. The web server 160 communicates to the ad server 100, and alternatively the ad server 100 can communicate directly through the Internet 170 to the client 175. The ad server 100 communicates with the administration and reporting server 140, the affinity framework 110, and the persistent storage framework 180. The engine loading and registration 120, in one embodiment part of the affinity framework 110, communicates with the various engines. The data access solutions communicate with the data store 190.

Various forms of communications are allowed between the elements of FIG. 1. For example, TCP/IP can be used for communications. Additionally, socket communications can be used to communicate between various programs in the system. Additionally, local area networks are supported in various embodiments of the invention.

The following describes the various elements of FIG. 1 and their operations.

The ad server 100, including the ad exec program 101, in combination with the affinity framework 110, provides a flexible and efficient system for selecting the best-fit advertisement to show a user at the client 175. In other embodiments, the ad server 100 can also be used in other types of applications other than advertising. For example, the ad server 100 can be used for job banks and educational applications, where dynamically generated information is being displayed. The ad selection is based partially on matching psychographic, demographic, geographic, sociographic, and other information about the individual to a set of possible advertisements. The ad server 100 also allows ad selection to be constrained by characteristics external to the individual, such as ad impression limits and advertisement priorities based on revenue optimization.

The ad server 100 corresponds to a computer running one or more programs such as the ad exec program 101. The ad server 100 can be, for example, a Sun workstation, or any other computer, running one or more programs. A program is one or more instructions that can be executed by a computer or processor.

The affinity framework 110 represents an application programming interface (API) that allows various affinity engines to be easily added to and removed from the system.

In some embodiments, an affinity engine is an object-oriented, data-type-specific database machine. The purpose of an affinity engine is to map an instance of an entity, an engine-specific affinity attribute, into a set of <object-instance name, floating point value> ordered pairs. The floating point value associated with an object-instance name is called an affinity measure. An affinity measure is a value between 0 and 1 (inclusive). The value is proportional to the affinity between the attribute and the named object. A measure of 0 means no affinity; a measure of 1 means perfect affinity; and a measure between 0 and 1 indicates partial affinity. Other embodiments use other techniques for denoting affinity, such as using integer values.

The set of results returned by an affinity engine is called a relevance list. Relevance lists may be combined using fuzzy logic and arithmetic operations to yield new relevance lists. By combining lists, one may produce combined affinity measures.

The affinity of an attribute to an object is determined by comparing the attribute to an affinity criterion associated with the object. For instance, a user's demographic attribute would be compared to an advertisement's demographic criterion in order to measure the demographic affinity of the user to the advertisement.

The engine loading and registration module 120 supports the loading and registration of these engines for the ad server 100.

The page sponsor engine 112 represents an affinity engine that finds advertisements that are associated with a particular page request from the client 175. These advertisements correspond to sponsors' ads for that specific page.

The key word sponsor engine 114 corresponds to a key word sponsorship of advertisements for key words included in the request from the client 175. The key words may be associated with the particular page 179, or a search that is performed by the client 175, for example.

The content stream engine 116 analyzes the content of the page 179 and attempts to match a corresponding advertisement reflecting the interests of the user. One embodiment of such a content stream engine 116 is described in United States patent application entitled, "Content Stream Analysis," filed Apr. 24, 1997, having Ser. No. 08/847,778, and inventor Stephen J. Kurtzman, II, incorporated herein by reference.

The user interest engine 118 selects advertisements that reflect the interests expressed by the user by, for example, a previously registered set of key words for the specific user.

The demographic engine 119 selects advertisements that matches with demographic information associated with the user.

The other engine 111 represents other types of engines that can be included. Such engines can include, for example, a browser information engine that provides advertisements that are to be associated with a particular browser 177 used by the client 175. Another example is a geographic engine providing advertisements that are associated with a particular geographic location of interest to the user. Other examples are a scheduling engine, an impressions engine, and an inventory control engine. The scheduling engine will select advertisements that should be served because of scheduling requirements. The impressions engine will select advertisements that have an impressions requirement so that advertisements do not get stale for a particular user. The inventory control engine can be used to maximize the profits of the owner of the web server. The inventory control engine allows for the selection between any given set of advertisements, the one that will provide the greatest amount of revenue for the web server owner. Of course, other embodiments of the invention have other types of engines.

The administration and reporting server 140 administers the data store 190 and provides reporting information about the performance of the ad server 100. The administration and reporting server 140 is a computer with a program that accesses the persistent storage framework 180 and the corresponding data store.

The persistent storage framework 180 represents an application programming interface (API). This API provides a common interface for any data access module that could be used to access data in the data store 190. The ISAM 182, the RDBMS 184, the ODBC 186, and the third party data access solution 188 are all representative of interfaces for accessing data storage systems.

The data storage system 190 stores advertisements and other information used in the system.

In one embodiment, the system uses a specialized storage and caching technique described in United States patent application, "persistent object storage system," having inventors Stephen J. Kurtzman, II, and Sandeep Nawathe, filed on XXX, having serial number XX/XXX,XXX, incorporated herein by reference. This technique allows for the system to be distributed over a network of computers.

The client 175 is representative of a computer used to access the Internet 170. The client 175 is executing the browser program 177. In other embodiments, other techniques for accessing the Internet 170 can be used, such as an integrated browsing and operating system, such as Windows 98. The browser 177 is responsible for displaying a page 179. The page is a dynamically generated display of information. The page 179 includes advertisement 174 and advertisement 172 that were retrieved from the ad server 100. The page 179 corresponds to, for example, an HTML (Hypertext Mark Up Language) page. The Internet 170 represents any form of communications network that would support computer communications.

The web server 160 represents a World Wide Web (referred to as the "web") server such as a Windows NT computer running a software server from Apache. The CGI 162 represents any program that would be able to access the ad server 100 to request advertisements. This functionality may be included in the web server 160 in a variety of ways.

Although various computers are described as representing the entire system of FIG. 1, it is possible that other embodiments of the invention have other configurations. For example, the web server 160, the ad server 100, and the administration and reporting server 140 could all be on one computer system or on multiple computers. Similarly, the data store and persistent storage framework 180 could be on a distributed processing network of computers.

Other embodiments of the invention include computer program products that have programs that can select and serve media for dynamically generated information. Examples of the types of computer program product can include CDs, zip disks, hard disks. The programs for the various engines and the servers can be included on one or more of these products.

Serving Advertisements Using the System

Figure 2:
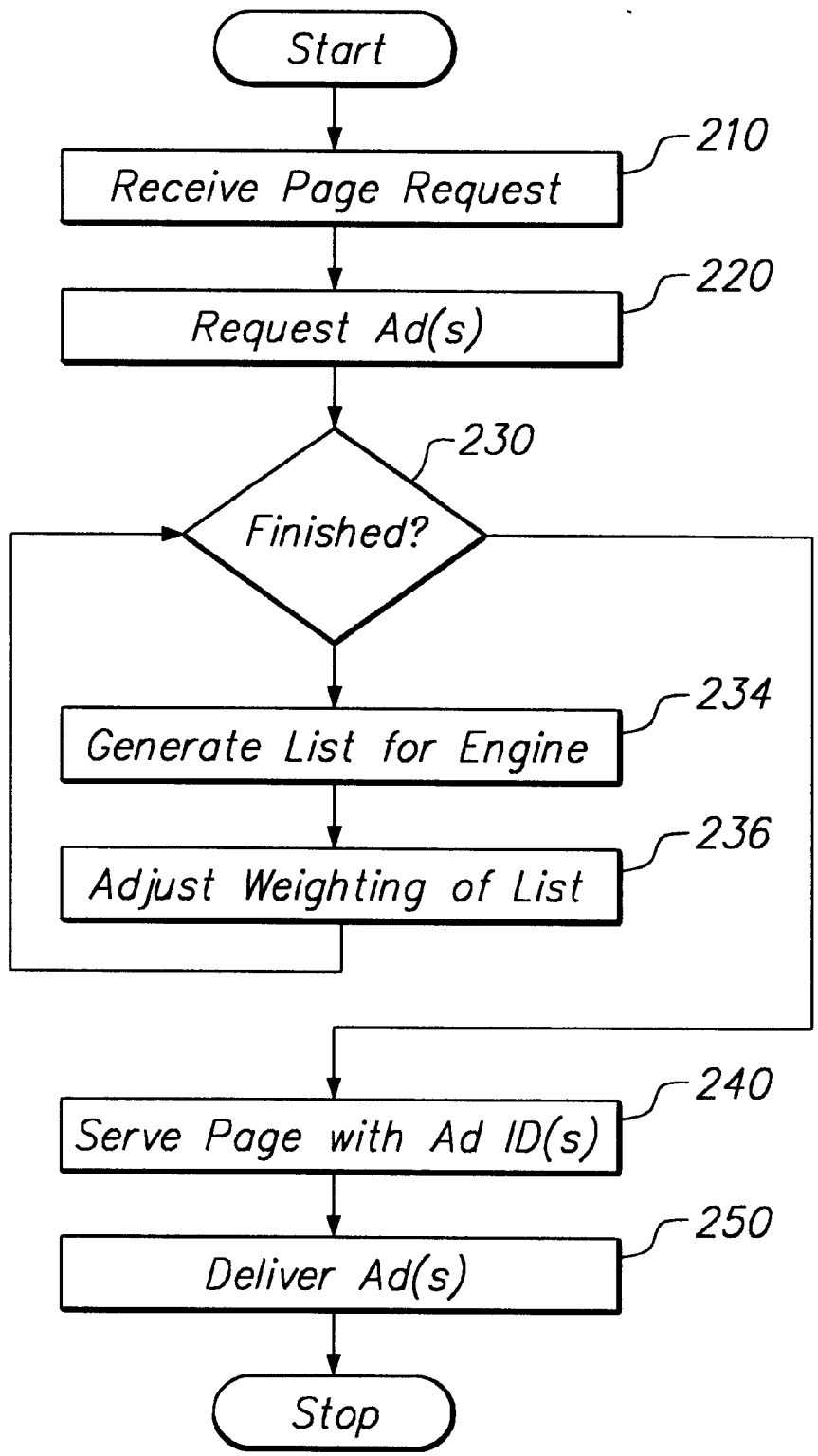
FIG. 2 illustrates one embodiment of a method of selecting and serving advertisements.

FIG. 2 illustrates one example of a way in which advertisements can be dynamically provided and displayed in the browser 177. Other embodiments of the invention will have other methods of providing, and displaying, those advertisements.

At block 210, the client 175 sends a request to the web server 160. In one embodiment, this is an HTTP request from the client 175 to the web server 160. The client 175 is requesting a specific URL (universal resource locator). As part of this request, information is provided to the web server 160 which identifies at least the TCP/IP address of the client 175. The web server 160 may also be able to access cookies stored by the browser 177, or other information about the user of the client 175. The web server 160 can use this information to find other data the web server 160 has about that user. Any, or all, of this data can be used in finding appropriate advertisements for the user.

At block 220, the web server 160, using the CGI 162, makes a request of the ad server 100 to provide one or more advertisements. The request for these advertisements includes information about the user at the client 175. Such information may include a universal identity for that user, a TCP/IP address, demographic and/or sociographic information, previous advertisements displayed to that user, the content of the page being provided to the user, and the like. The ad server 100 may alternatively store much of this information for the web server 160. What is important is that some identifying information is provided to the ad server 100 that can be used by the various affinity engines in selecting advertisements for the user. If no such information is provided, the ad server 100 will use engines that do not require such information in ad selection.

At block 230, a test is made by the ad exec program 101 to determine whether the ad selection process is complete. The ad exec program 101 will determine that such a selection process is complete when one of the following events occur. The first event is that all of the engines in the affinity framework 110 have completed their processing and have provided their advertisements to the ad server 100. (Note, in some embodiments the engines provide references to the selected advertisements that are stored in the data store 190. The web server 160 gives these references to the browser 177.) A second event can occur when a sufficient number of advertisements are found so as to satisfy the request of the web server. Another event is when the ad exec program 101 must provide some advertisements to the web server 160 prior to the completion of the processing by all of the engines. This can occur for example, when the web server 160 has a particularly short time frame in which to serve a page to the client 175. Alternatively, this can occur when the ad server 100 is heavily loaded.

Block 234 and block 236 are performed simultaneously by the various engines. This process is performed until the finished state, at block 230, is reached.

Block 234 represents the generation of a list of advertisements for a given engine. For example, the page sponsor engine 112 will generate a list of advertisements appropriate for the given page given the sponsorship information sent by the web server 160. Examples of this process are described in greater detail in the description of an example engine API, below.

At block 236, an adjustment is made to the various weights applied to advertisements generated by each engine.

This weighting block allows the system to dynamically change the response characteristics for each engine. This is particularly useful for example, where one engine is generating far too many advertisements for its list relative to other engines. Additionally, a user of the ad server 100 can adjust the weightings of a particular engine such that that engine gives advertisements of a slightly higher priority. Additionally, the user can cause the affinity of a particular advertisement to be increased or decreased by a greater amount by a specific engine.

At block 240, the web server 160, using the CGI 162, generates the HTML information, including references to the advertisements provided by the ad server 100. The client 175 receives this HTML information and provides that information to the browser 177. The browser 177, in generating the page 179, will access these references and request the advertisements from the ad server 100. Typically, the references are redirections to the location of the ads in the ad server 100.

At block 250, the ad server 100 supplies the ad 172 and the ad 174 in response to the request from the client 175. The browser 177 can then include the advertisements in each dynamically generated page 179.

FIG. 2 represents but one example of a way in which ads are selected and served by the ad server 100. In other embodiments, the web server 160 will request a number of advertisements that can be stored for a particular user. This prevents the web server 160 from having to continuously request advertisements for each connection made by the client 175. Alternatively, the web server 160 can request ads from the ad server 100 to be immediately provided to the client 175, but then make subsequent requests based on the content of the information being requested by the client 175 (providing information for the content stream analysis engine). Thus, the web server 160 can cache advertisements for later use by the client 175.

B. Application Programming Interface (API)

The following sections describe the APIs for the ad server 100, the affinity framework 110, and the affinity engines. The classes described in the APIs, and their associated public and private functions, can be used in the ad server 100 and the engines to implement various embodiments of the invention.

Ad Server 100 API

One embodiment of the invention has an ad server 100 with the following API. The ad server 100 communicates to the external world using TCP/IP socket. In one embodiment, a Perl package provides implementation of this API. Note that these interfaces have natural expressions in both C++ and Java to allow easy migration of code between the two languages. Other embodiments of the invention use other languages.

In some embodiments, all the calls into the ad server 100 use some type of user identification. The ad server API supports COOKIES, SESSION IDs, digital ids, login names etc. While making an API call one of the identifiers is provided. The ad server 100 uses the first non null value in the following order:

'USERNAME': Site login name
'COOKIE': Site cookie
'EXTERNALID': Digital id or session id
'IPADDR': IP address of the browser machine In one embodiment, the IPADDR is used as a last resort identification NAME
   SubmitEvidence
SYNOPSIS
   require advantage;
   $output=advantage::SubmitEvidence($socket, $evidence);
DESCRIPTION
   SubmitEvidence submits some information about a user to the ad server 100. $socket is the socket descriptor, indicating the connected socket to the ad server 100, which was acquired through a prior ConnectToServer() call. $evidence is a reference to an associative array, where any number of values in the USERDATA structure may be set. User identification is provided in the $evidence associative array.
RETURN VALUE
   $output is a reference to an associative array where the following fields are set.
   $$output{'ERRORCODE'}: Error code from the ad server 100.
   Upon successful return the value of ERRORCODE field should be zero.
SEE ALSO
   USERDATA
EXAMPLE

```
require util;
require advantage;
my($socket) = util::ConnectToServer($SERVER,$PORT);
my(%evidenceData,$output) ;
$evidenceData{'USERNAME'} = 'mike';
$evidenceData{'AGE'} = 25;
....
$output = advantage::SubmitEvidence($socket,*%evidenceData);
if ($$output{'ERRORCODE'} != 0) {
ERROR ...
   }
```

NOTE
   This call may be used for the evidence data that needs to be provided only once during user visit, for example, after user login.
NAME
   SubmitEvidenceAndGetAd
SYNOPSIS
   require advantage;
   $output=advantage::SubmitEvidenceAndGetAd($socket, $evidence);
DESCRIPTION
   SubmitEvidenceAndGetAd submits some information about a user to the ad server 100 and fetches a best match advertisement for that user. $socket is the socket descriptor, indicating the connected socket to the ad server 100, acquired through prior a ConnectToServer() call. $evidence is a reference to an associative array, where any number of values in the USERDATA structure may be set. User identification is provided in the $evidence associative array.
RETURN VALUE
   $output is reference to an associative array where the following fields are set.
   $output{'ERRORCODE'} Error code from the ad server 100.
   $$output{'ADID'} Identifier for the best match ad, this may be used later to notify a click.
   $$output{'ADGIF'} Image file for the ad, this may a URL or path name.

$$output{'ADDEST'} Destination of the ad.

$$output {'ADALTERNTEXT'} Alternate text for the ad.

Upon successful return the value of ERRORCODE field should be zero.

SEE ALSO

USERDATA, SubmitEvidenceAndGetNAds

EXAMPLE

The following example shows how to form an HTTP snippet to be inserted into dynamic pages such as can be used to generate the page 179.

```
require advantage;
my(%evidenceData,$output);
$evidenceData{'USERNAME'} = 'mike';
$evidenceData{'PAGDID'} = 'Some URL';
....
$output = advantage::SubmitEvidenceAndGetAd($socket,*%evidenceData);
if ($$output{'ERRORCODE'} != 0 {
ERROR ...
}
my($httpSnippet)=<a href=
/cgibin/click.p1?ADID=$$output{'ADID'}&DEST=$$output{'ADDEST'}> <img
src=$$output{'ADGIF'} alt=$$output{'ADALTERNTEXT'}> </a>;
```

NAME

GetAd

SYNOPSIS require advantage;

$output=advantage::GetAd($socket,$evidence);

DESCRIPTION

GetAd fetches a best match ad for a user. $socket is the socket descriptor, indicating the connected socket to the ad server 100, acquired through prior a ConnectToServer() call. $evidence is a reference to an associative array. User identification is provided in the $evidence associative array.

RETURN VALUE $output is reference to an associative array where the following fields are set.

$$output{'ERRORCODE'} Error code from the ad server 100.

$$output{'ADID'} Identifier for the best match ad, this may be used later to notify a click.

$$output{'ADGIF'} Image file for the ad, this may a URL or path name.

$$output{'ADDEST'} Destination of the ad.

$$output{'ADALTERNTEXT'} Alternate text for the ad.

Upon successful return the value of ERRORCODE field should be zero.

SEE ALSO

USERDATA, GetNAds

EXAMPLE

See SubmitEvidenceAndGetAd.

NAME

NotifyClick

SYNOPSIS require advantage;

$output=advantage::NotifyClick($socket,$addata);

DESCRIPTION

NotifyClick registers a user's click on an ad. $socket is the socket descriptor, indicating the connected socket to the ad server 100, acquired through a prior ConnectToServer() call. $addata is a reference to an associative array. User identification is provided in the $addata associative array, also 'ADID' is provided for registering a click. If ADID is not available try using NotifyClickAndGetDestination.

RETURN VALUE $output is reference to an associative array where the following fields are set.

$$output{'ERRORCODE'}: Error code from the ad server 100.

Upon successful return the value of ERRORCODE field should be zero.

SEE ALSO

USERDATA, NotifyClickAndGetDestination

EXAMPLE

```
require advantage;
my(%addata,$output);
$addata{'USERNAME'} = $user;
$addata{'ADID'} = $adid;
$output = advantage::NotifyClick($socket,*%addata);
if ($$output{'ERRORCODE'} != 0) {
ERROR ...
}
```

NAME

NotifyClickAndGetDestination

SYNOPSIS require advantage;

$output=advantage::NotifyClickAndGetDestination ($socket,$addata);

DESCRIPTION

NotifyClickAndGetDestination registers a user's click on an ad for a given ADSELECTORID. $socket is the socket descriptor, indicating the connected socket to the ad server 100, acquired through prior a ConnectToServer() call. $addata is a reference to an associative array. User identification is provided in the $addata associative array, also 'ADSELECTORID' is provided.

This call needs to be used when the ads are placed in static pages using CGIs. Each ad placement request provides the 'ADSELCTORID' while trying to fetch an ad from the ad server 100. The ad server 100 internally keeps a list of ADSELCTORID for the ADIDS for each user. The call NotifyClickAndGetDestination recalls the ADID for the given (user,ADSELCTORID) pair. From that ADID, the ad server 100 retrieves the ad destination field and registers the click.

RETURN VALUE $output is a reference to an associative array where the following fields are set.

$$output{'ERRORCODE'} Error code from the ad server 100.

$$output{'ADDEST'} The destination URL.

Upon successful return the value of ERRORCODE field should be zero.

SEE ALSO

USERDATA

EXAMPLE

The following example shows click registration and HTTP redirect to the destination.

```
require advantage;
my(%addata,$output);
$addata{'USERNAME'} = $user;
$addata{'ADSELCTORID'} = $adselectorid;
$output = advantage::NotifyClickAndGetDesitnation($socket,*%addata);
if ($$output{'ERRORCODE'} != 0) {
ERROR . . .
}
print STDOUT Location: $$output{'ADDEST'}\n\n;
```

NAME

SubmitEvidenceAndGetNAd

SYNOPSIS require advantage;

$output=advantage::SubmitEvidenceAndGetNAd ($socket,$evidence);

DESCRIPTION

SubmitEvidenceAndGetNAd submits some information about a user to the ad server 100 and fetches a best match ad for that user. $socket is the socket descriptor, indicating the connected socket to the ad server 100, acquired through prior a ConnectToServer() call. $evidence is a reference to an associative array, where any number of values in the USERDATA structure may be set. User identification is provided in the $evidence associative array. The field 'NUMBEROFADSPERPAGE' indicates the number of advertisements to be fetched. The field PAGEID is set to indicate the page for which multiple ads are requested.

When this call is made for first time the ad server 100 generates NUMBEROFADSPERPAGE ads for the page. The call returns however with the first ad in the set. Consecutive calls of same function or the function GetNAds returns the next ad in the set, provided the user id and the PAGEID match. If at any time there are not any ads in the pre-generated set then a new set of ads is generated for that page.

RETURN VALUE $output is a reference to an associative array where the following fields are set $$output{'ERRORCODE'} Error code from the ad server 100.

$$output{'ADD'} Identifier for the best match ad, this may be used later to notify a click.

$$output{'ADGIF'} Image file for the ad, this may a URL or path name.

$$output{'ADDEST'} Destination of the ad.

$$output{'ADALTERNTEXT'} Alternate text for the ad.

Upon successful return the value of ERRORCODE field should be zero.

SEE ALSO

USERDATA, SubmitEvidenceAndGetAd

NAME

GetNAd

SYNOPSIS require advantage;

$output=advantage::GetNAd($socket,$evidence);

DESCRIPTION

GetNAd generates a set of best matching ads for the user, it returns the first ad in the set. $socket is the socket descriptor, indicating the connected socket to the ad server 100, acquired through prior a ConnectToServer() call. $evidence is a reference to an associative array. User identification is provided in the $evidence associative array. The field 'NUMBEROFADSPERPAGE' indicates the number of advertisements to be fetched. The field PAGEID must be set to indicate the page for which multiple ads are requested.

When this call is made for the first time the ad server 100 generates NUMBEROFADSPERPAGE ads for the page. The call returns however with the first ad in the set. Consecutive calls of same function or the function SubmitEvidenceAndGetNAds returns the next ad in the set, provided the user id and the PAGEID match. If at any time there are not any ads in the pre-generated set, then a new set of ads is generated for that page.

RETURN VALUE $output is a reference to an associative array where the following fields are set.

$$output{'ERRORCODE'} Error code from the ad server 100.

$$output{'ADID'} Identifier for the best match ad, this may be used later to notify a click.

$$output{'ADGIF'} Image file for the ad, this may a URL or path name.

$$output{'ADDEST'} Destination of the ad.

$$output{'ADALTERNTEXT'} Alternate text for the ad.

Upon successful return the value of ERRORCODE field should be zero.

SEE ALSO

USERDATA, GetAd

NAME

USERDATA

SYNOPSIS require advantage;

@USERDATA

DESCRIPTION

USERDATA is simple array of strings. The strings describe various fields that can be set for the API. See individual API functions for usage of special fields marked with asterisks.

| | |
|---|---|
| USERNAME | Login name (12 bytes max) |
| GROUPNAME | Group name, if any |
| COOKIE | Cookie |
| EXTERNALID | 12 bytes max (set STARPOINT_EXTERNALID = 1) |
| REFERER | The URL which referred this |
| BROWSER | Netscape: IE etc. (string) |
| OS | NT:Win95 etc. (string) |
| HOSTNAME | Hostname from where the request originated |
| IPADDR | IP address of the originator |
| DOMAINNAME | Domain name of the originator |
| PAGEID | Unique page reference (string) can be URL |
| KEYWORD | Any keywords user typed |
| PAGEDATA | The page contents user is looking at. |
| ADID | The adid of the ad user clicked on |
| ADSELECTORID | Optional value to be statically inserted in pages such that the ad server 100 remembers the ads shown |
| AGE | Demographic data 0 .. ddd |

| | |
|---|---|
| NUMBEROFCHILDREN | Demographic data 0 .. ddd |
| HOUSEHOLDINCOME | Demographic data 0 .. ddd k$/year |
| GENDER | Demographic data 0=unknown 1=male 2=female |
| MARITALSTATUS | Demographic data 0=unknown, 1=single, 2=married, 3=divorced |
| OCCUPATION | Demographic data string |
| NUMBEROFADSPERPAGE | Number of ads to be placed on page |
| USERINTEREST | Psychographic data for Psychographic engine. Syntax: :<Value>[, Value>]*:: |

Engine API

This section describes the API for the affinity engines. The API allows the various engines to receive selection criteria from the ad server 100, access advertisement information, and use the selection criteria and the advertisement information to determine affinity values for various advertisements. The API allows the affinity engines to provide the list of advertisements back to the ad server 100.

An important advantage of some embodiments of the invention is that the engine API supports unknown future applications for serving dynamically generated media, as well as the evolution of the advertising application. The engine API supports different and currently unknown types of constraints and matching operations.

An advantage of the API presented in this section is that all the engines have a common interface. The common interface allows developers to quickly add and change engines for an ad server 100. This feature is important in markets such as web advertising because of the dynamic nature of the web. In some embodiments, specialized engines are built directly into the ad server 100 and do not comply with this API. These engines may be built this way to increase the performance of those engines.

Another advantage of the API presented herein is that it can be extended to add functionality.

Figure 3:
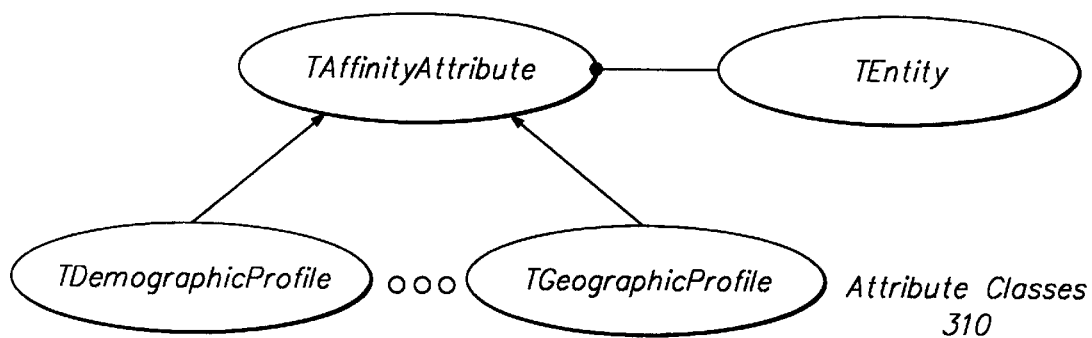
FIG. 3 illustrates example of classes that can be in used in the computer system of FIG. 1.
Figure 3:
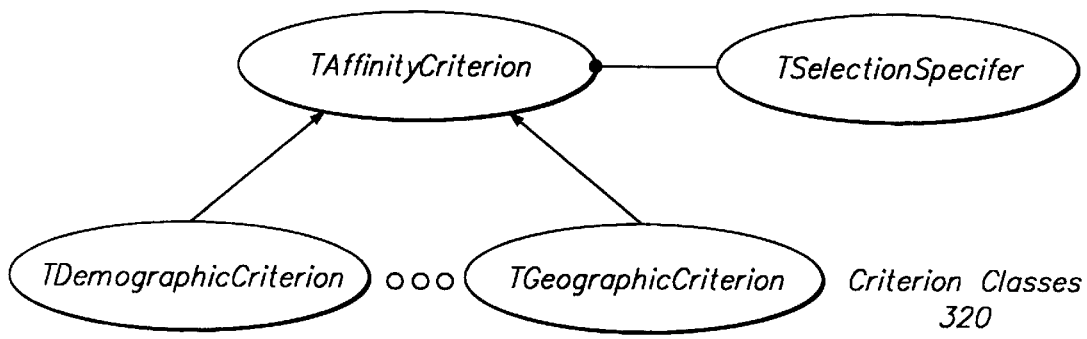
Figure 3:
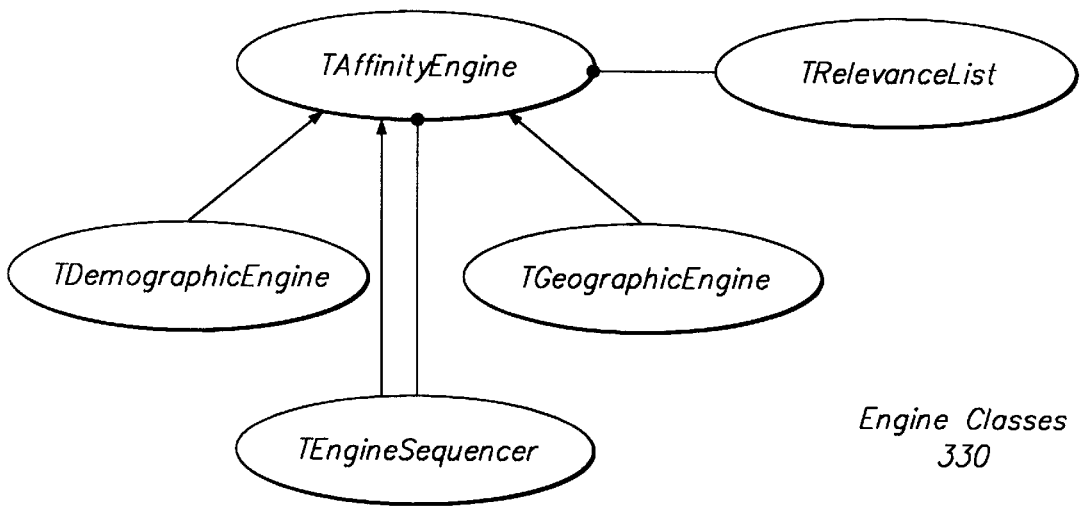

FIG. 3 illustrates some of the classes described in this section. For each affinity engine type, there is an associated affinity attribute type and a corresponding affinity criterion type. For a given engine, this triple of types comprises the definition of a loadable affinity engine module (e.g., page sponsor engine 112) which can be loaded by the engine loading and registration 120 into the ad server 100. In some embodiments, each affinity engine module is implemented as a dynamically loadable class library. These classes use dependence, or a subset of dependence inheritance. The support classes used by the other classes, then the affinity attributes and the affinity criterion, and then the affinity engine classes are described.

TReferenceCountedPointer

TReferenceCountedPointer is a templatized class that implements a reference counted pointer to keep track of the number of references to a given object These classes are used to implement garbage collection, among other functions. These classes are not shown in FIG. 3. Other embodiments of this invention do not require explicit reference counts because the language used to implement the invention automatically provides such reference counts.

Interface Definition

```
template <class X>
class TReferenceCountedPointer {
public:
    TReferenceCountedPointer(X* pointerToObject = 0);
        // create a reference counted pointer class by passing it a
        // pointer to the object that is being reference counted.
        // the object is adopted by TReferenceCountedPointer.
        // because the object is adopted, only use this constructor
        // once for any pointer. if you use it twice, then someone will
        // be "disappointed" when their pointer becomes invalid.
    TReferenceCountedPointer(const TReferenceCountedPointer&);
    TReferenceCountedPointer& operator=(const TReferenceCountedPointer$);
    TReferenceCountedPointer& operator=(X* pointerToObject);
        // make new reference counted pointers from old ones by
        // using either the copy constructor or the assignment operator.
    ~TReferenceCountedPointer( );
        // deleting the reference counted pointer object will decrement
        // the reference count ot the pointer and delete the object itself
        // if the reference count goes to zero.
    long GetReferenceCount( );
    X* operator—>( ) const;
        // returns a pointer to the ref counted object so that can
        // instance of TReferenceCountedPointer<X> can be accessed
        // in the same way as X*.
    X& operator*( ) const;
        // dereference operator returns a reference to the ref counted object
        // so that an instance of TReferenceCountedPointer<X> can be accessed
        // in the same wasy as X*.
        // below are convenience operators to allow TReferenceCountedPointers
        // to be used just like regular pointers
    friend int operator==(const TReferenceCountedPointer<X>& p1,
                          const TReferenceCountedPointer<X>& p2);
    friend int operator==(const void* p1,
                          const TReferenceCountedPoint<X>& p2);
```

-continued

```
        friend int operator==(const TReferenceCountedPoint<X>& p1,
                              const void* p2) ;
        friend int operator==(const int,
                              const TReferenceCountedPointer<X>& p2);
        friend int operator==(const TReferenceCountedPointer<X>& p1,
                              const int);
}
```

Subclassing Example
   This class is not meant to be subclassed.
Implementation Issues
   TReferenceCountedPointers are used liberally throughout the definition of the affinity engine framework 110. Each platform implements this class in the most efficient way possible. That means, each platform implements the class using the fastest possible atomic operation, e.g. "Compare and Swap".
TAffinityAttribute
   FIG. 3 illustrates the attribute classes 310. An affinity engine works by selecting abstract entities that are represented by a type of data object called an affinity attribute. The internal structure of an attribute object will vary from engine to engine. For instance, a demographic affinity attribute may specify age, sex, and income information; a geographic affinity attribute may store information about zip codes, states, and countries.
   The primary function of TAffinityAttribute is to serve as the abstract type for engine-related attributes. This allows objects to receive, store, and pass arbitrary attribute types as TAffinityAttribute pointers. No restrictions are placed upon the structure or complexity of an affinity attribute by the TAffinityAttribute base class.
Interface Definition

```
//**********************************************************
// TAffinityAttribute is the abstract base class for all engine-
// specific attribute data. The class serves to define common
// protocol for attributes data and as a type-check mechanism to
// for collecting disparate types of attribute information
// into a single container.
//
// The base class does not specify a protocol for how attribute data
// is stored or accesssed by a client.
//**********************************************************
class TAffinityAttribute {
public:
    TAffinityAttribute ( );
    ~TAffinityAttribute ( );
    TAffinityAttribute (const TAffinityAttribute &);
    TAffinityAttribute & operator=(const TAffinityAttribute &);
    TModuleID GetModuleID ( );
    // TModuleID is an identifier which is unique to a given
    // Affinity Engine Module. The details of the implementation
    // of this class are platform specific and depend upon the
    // characteristics of the runtime support provided. However,
    // what is important is that each Affinity Engine Module
    // will have a unique identity within the system. The value
    // returned by GetModuleID will be the same for each type in
    // an Affinity Engine Module (i.e., for the attribute, criterion,
    // and engine objects in the module).
};
```

Subclassing Example
   The following code shows how to subclass TAffinityAttribute to create an attribute that contains demographic information.

```
//**********************************************************
// Simple TAffinityAttribute subclass example for demographic data.
//**********************************************************
class TDemographicProfile : public TAffinityAttribute {
public:
    TDemographicProfile ( );
    ~TDemographicProfile( );
    TDemographicProfile(const TDemographicProfile&);
    TDemographicProfile& operator=(const TDemographicProfile&);
    TDemographicProiflle (const TString& name);
    enum ESex (kMale, kFemale, kUnknown);
    // Getters & Setters
    ESex GetSex( )
           {return fSex;};
    unsigned short GetAge ( )
           {return fAge;};
    void SetSex(ESex sex)
           (fSex = sex;};
    void SetAge(unsigned short age)
           {fAge = age;};
private:
    Esex              fSex;
    unsigned short    fAge;
}
```

Related Issues
   The data storage framework implements a protocol for refreshing, and committing data within a TAfinityAttribute. TAfinityAttributes descends from a class called TObject which implements a protocol for synchronizing information with various caches. That protocol is described in the United States patent application entitled, "Distributed Computer Storage System and Method" application serial number XX/XXX,XXX, filed XXXXXX, 199X, having inventors Stephen J. Kuran II and Sandeep A. Nawathe.
TEntity
   TEntity is an abstract base class that defines a protocol for retrieving affinity attributes from an object. Examples of TEntities might be documents, advertisements, ad campaigns, or users.
   TEntity does not define any mechanisms for creating, modifying, or storing attribute information. Thus, subclasses of TEntity are free to define their own mechanisms for handling these operations. This is important because an entity may keep and modify data in some other form than the common TAffinityAttribute. For instance, a user object may keep and manipulate attribute information in a relational database and only create affinity attribute objects when called by GetAttributeDatum.
Interface Definition

```
//**********************************************************
// TEntity is an abstract base class which makes an
// object type useable by Affinity Engines. TEntity
// defines the protocol for accessing affinity attribute
// information and etntity naming. Note that the class does not
```

-continued

```
// define a protocol by which to initialize or change attribute
// information. This is deferred to the subclass.
//**************************************************************
class TEntity {
public:
    TEntity ( );
    virtual ~TEntity ( );
    TEntity (const TEntity &);
    TEntity & operator=(const TEntity &);
    virtual TReferenceCountedPointer<TAffinityAttribute>
        GetAttributeDatum(TModuleId attributeType) = 0:
    // Returns a reference counted pointer to a TAffinityAttribute
    // object of the type specified by attributeType. If such attribute
    // information does not exist for this TSelectableEntity, it returns
    // a reference-counted pointer to a null.
    //
    // Note: it is possible that a particular instance of
    // TEntity could have multiple affinity attributes of the
    // same type (i.e., with the same value for TModuleID). For instance,
    // the long-term psychographic attribute information for a user object
    // might include a set of information affinity vectors, all
    // having the same type. In such a case, GetAttributeDatum may
    // return an object if the semantics of the TEntity subclass are
    // such that there is a reasonable or natural way to define a single
    // object to return. If it does not make semantic sense to return a
    // single object, then the subclass should return a null.
```

Subclassing Example

Below is an example implementation of a class called TAttributeBag. TAttributeBag is a kind of collection class for attribute information. It is given to suggest one possible way for a subclass to get and set of attribute values.

Below is an example of how a TUser might be defined using a TAttributeBag.

```
class TUser: public TAttributeBag {
    TUser(TString& name);
    // ...
}
// ... somewhere in someone's code ...
    TString name = GenerateUserName( );
    TGeographicAttribute place = GenerateGeographicData( );
    TDemographicAttribute details = GeneratedDemographicProfile( );
    TUser newUser(name);
    newUser.SetAttributeData(place);
    newUser.SetAttributeData(DETAILS);
// newUser now has attribute data. note that from a formal standpoint,
// it is perfectly acceptable for a user to have no attribute data.
```

TAffinityCriterion

The criterion classes 320 are now described. TAffinityCriterion object is a counterpart to a TAffinityAttribute object. In particular, it is engine-specific information that is used to select entities. Examples of selection criteria would be a demographic age-range. For a query-by-example over a collection of documents, a document might be a TAffinityCriterion. For a sociographic engine, a user might be a TAffinityCriterion.

Note that for every TAffinityAttribute subclass, there exists a TAffinityCriterion subclass which, in essence, specifies a query over a set of affinity attributes.

```
#include <map.h>    // include STL map function
//**************************************************************
// TAttributeBag is a concrete class which can be used as a base
// to make an object type usable by Affinity Engines.
//**************************************************************
class TAttributeBag: public TEntity {
public:
    TAttributeBag( ) { };
    virtual ~TAttributeBag( ) { };
    TAttributeBag(const TAttributeBag&);
    TAttributeBag& operator=(const TAttributeBag&);
    virtual void SetAttributeData(TAffinityAttribute & dataToSet);
    // take a TAffinityAttribute and remember it.
    // If an attribute of the same type already exists, then overwrite it.
    Virtual TReferenceCountedPointer<TAffinityAttribute>
        GetAttributeDatum(TModuleID attributeType);
    // return a pointer to attribute data or a null pointer if no such
    // attribute exists.
private:
    typedef map<TModuleID, TAffinityAttribute&, less<TModuleID> > TDataBag;
    // TString is a C++ string class replacement.
    TDataBag      fDataBag;
}
void TAttributeBag:: SetAttributeData (TAffinityAttribute& dataToSet)
{
    fDataBag[dataToSet.GetModuleID( )] = dataToSet;
}
const TAffinityAttribute& TAttributeBag::GetAttributeData(TModuleID dataType)
{
    TDataBag::const_iterator location = fDataBag.find(dataType);
    if (location == fDataBag.end( ))
        return 0;
    else
        return (*location).second;
}
```

Interface Definition

```
//*************************************************************
// TAffinityCriterion is the abstract base class for all engine-
// specific selection criteria. The class defines common
// protocol for affinity criteria as well as providing
// a type-check mechanism for collecting together disparate
// criteria into a single container.
//
// The base class does not specify a protocol for storing or
// accessing criteria data.
//*************************************************************
class TAffinityCriterion {
public:
    TAffinityCriterion ( );
    ~ TAffinityCriterion ( );
    TAffinityCriterion (const TAffinityCriterion &);
    TAffinityCriterion & operator=(const TAffinityCriterion &);
    TModuleID GetModuleID ( );
    // TModuleID is an identifier which is unique to a given
    // Affinity Engine Module. The details of the implementation
    // of this class are platform specific and depend upon the
    // characteristics of the runtime support provided. The value
    // returned by GetModuleID will be the same for each type in
    // an Affinity Engine Module (i.e., for the attribute, criterion,
    // and engine objects in the module).
}
```

Subclassing Example

The following code shows how to subclass TAffinityCriterion to create a demographic affinity criterion object.

```
//*************************************************************
// Simple TAffinityCriterion subclass example for demographic data.
//*************************************************************
class TDemographicCriterion : public TAffinityCriterion {
public:
    TDemographicCriterion ( );
    ~ TDemographicCriterion ( );
    TDemographicCriterion (const TDemographicCriterion &);
    TDemographicCriterion & operator=(const TDemographicCriterion &);
    // Getters & Setters
    TDemographicProfile::ESex GetSexCriterion( )
            {return fSex;};
    void GetAgeRange(unsigned short& low, unsigned short& high)
            {low = fLowAge; high = fHighAge;};
    void SetSexCriterion(ESexCriterion sex)
            {fSex = sex;};
    void SetAgeRange(unsigned short low, unsigned short high)
            {fLowAge = low; fHighAge = high;};
private:
    TDemographicProfile::ESex    fSex;
    unsigned short               fLowAge;
    unsigned short               fHighAge;
}
```

TSelectionSpecifier

TSelectionSpecifier is a base class for collecting together selection criteria that are used by Affinity Engines. TSelectionSpecifier is the counterpart to TEntity.

```
//*************************************************************
// TSelectionSpecifier is an abstract base class which makes an
// object type useable as a supplier of affinity criteria to
// an Affinity Engine.
//*************************************************************
class TSelectionSpecifier {
public:
    TSelectionSpecifier ( );
    ~ TSelectSpecifier ( );
    TSelectionSpecifier (const TSelectionSpecifier &);
    TSelectionSpecifier & operator=(const TSelectionSpecifier &);
    virtual const TReferenceCountedPointer<TAffinityCriterion>
            GetCriterion(const type_info& criterionType) = 0;
    // returns a pointer to a TAffinityCriterion object of type
    // specified by type_info if such criteria information exists
    // for this object. Subcalssers should override this method
    // to provide attribute content to the caller. The caller
    // // adopts the TAffinityAttribute object returned by this method.
}
```

Subclassing Example

Because of the parallels between TAfinityAttribute and TAffinityCriterion, it is simple to construct a TCriterionBag using the TAttributeBag as an example

TAffinityEngine

Now the engine classes 330 are described. TAffinityEngine is a virtual base class that defines the top level protocol for Affinity Engine use.

```
class TAffinityEngine : public MCloneable {
public:
    TAffinityEngine ( );
    virtual ~TAffinityEngine ( );
    TAffinityEngine(const TAffinityEngine &);
```

```
    TAffinityEngine& operator=(const TAffinityEngine&);
//*** Add, Remove, and Update methods below are used to initialize
//*** and maintain an engine's internal data storage.
    virtual void AddSelectSpecifier(TSelectionSpecifier&) = 0;
    // add a new selection specifier (i.e., advertisement or
    // document) to the engine.
    virtual void RemoveSelectionSpecifier(TSelectionSpecifier&) = 0;
    // remove a selection specifier (i.e., advertisement or
    // document) from the engine.
    virtual void UpdateSelectionSpecifier(TSelectionSpecifier&) = 0;
    // update a previous submitted selection specifier
//*** Generate, Recognize, and FIlter methods below are used to query
//*** an engine.
    virtual TReferenceCountedPointer<TRelevanceList> Generate(TEntity&) = 0;
    // generate a TRelevanceList for an entity.
    virtual TReferenceCountedPointer<TRelevanceList>
            Recognize(TEntity&, const TRelevanceList&) = 0;
    // generate a TRelevanceList for an entity, but restrict the output
    // to contain only items in the TRelevanceList passed into the
    // method as the second argument.
    virtual void Filter(TEntity&, TRelevanceList&) = 0;
    // filter the input TRelevanceList through the current engine.
    // filtering has the same semantic effect as doing a
    // coordinatewisemultiply the input with the result returned
    // by Recognize. The difference is
    // that the input TRelevanceList is altered.
//*** Each engine contains a reader/writer lock to allow it to synchronize
//*** its own operation. In one embodiment, the reader/writer lock provided
//*** by the RogueWave class library is used on the Solaris and NT
//*** platforms.
    friend class TEngineReadSynchronizer;
    friend class TEngineWriteSynchronizer;
protected:
    RWReadersWriterLock fEngineSynchronizer;
};
```

TRelevanceList

TRelevanceList is a concrete class returned by affinity engines. That is, affinity engines return lists of entities with non-zero relevance using a TRelevanceList.

TRelevanceList is a subclass of the Standard Template Library map function. This list may be iterated by using the supplied iterators for the map.

Interface Definition

```
typedef multimap<float, RWCString, greater<float> > TPrioritizedList;
typedef TStringFloatMap map<RWCString, float, less<RWCString> >;
class TRelevanceList : public TStringFloatMap {
public:
    TRelevanceList ( );
    virtual ~ TRelevanceList ( );
    TRelevanceList (const TRelevanceList &);
    TRelevanceList & operator=(const TRelevanceList &);
    FuzzyAnd(const TRelevanceList& other);
    // "this" is modified to contain the fuzzy AND of each
    // element in "this" with its corresponding element in
    // "other".
    FuzzyOr(const TRelevanceList& other);
    // "this" is modified to contain the fuzzy OR of each
    // element in "this" with its corresponding element in
    // "other".
    virtual void FuzzyClosedWorldNot( );
    // the value of each element of "this" is modified to contain one
    // minus the element's present value. Note: elements with an
    // affinity measure of one will be deleted from the list. elements
    // not in the list (i.e., those whose measure is zero) will not be
    // added to the list. Thus, this function is a closed-world not
    // because it assumes the universe of elements is completely
    // exhausted by those already on the list.
    VectorAdd(const TRelevanceList& other);
    // "this" is modified to contain the element-wise addition
    // of each element in "this" with its corresponding element in
    // "other".
    VectorSubtract(const TRelevanceList& other);
    // "this" is modified to contain the element-wise addition
    // of each element in "this" with its corresponding element in
    // "other".
    virtual void Fuzzify( );
    // normalize the vector so that no value is greater than 1 and
    // values less than zero are removed
    virtual void Normalize( );
    // normalize the vector
    virtual void FuzzifyThenNormalize( );
    // normalize the vector
    virtual void NormalizeThenFuzzify( );
    // normalize the vector
    virtual void CoordinatewiseMultiply(const TRelevanceList &other);
    // "this" is assign the elementwise multiplication of "this" and
    // "other". coordinates not present in both are eliminated.
    virtual void MultiplyByScalar(float scalar);
    // each element of "this" is multiplied by scalar
    virtual void Intersect(const TRelevanceList &other);
    // all element of "this" which are not also in "other" are removed.
    virtual void Remove(const TRelevanceList &other);
    // all elements of "other" are removed from "this".
    virutal TReferenceCountedPointer<TPrioritizedList>
GetPriorityizedList( );
    // extract a prioritized list from "this"
};
}
```

C. Example Search

Figure 4:
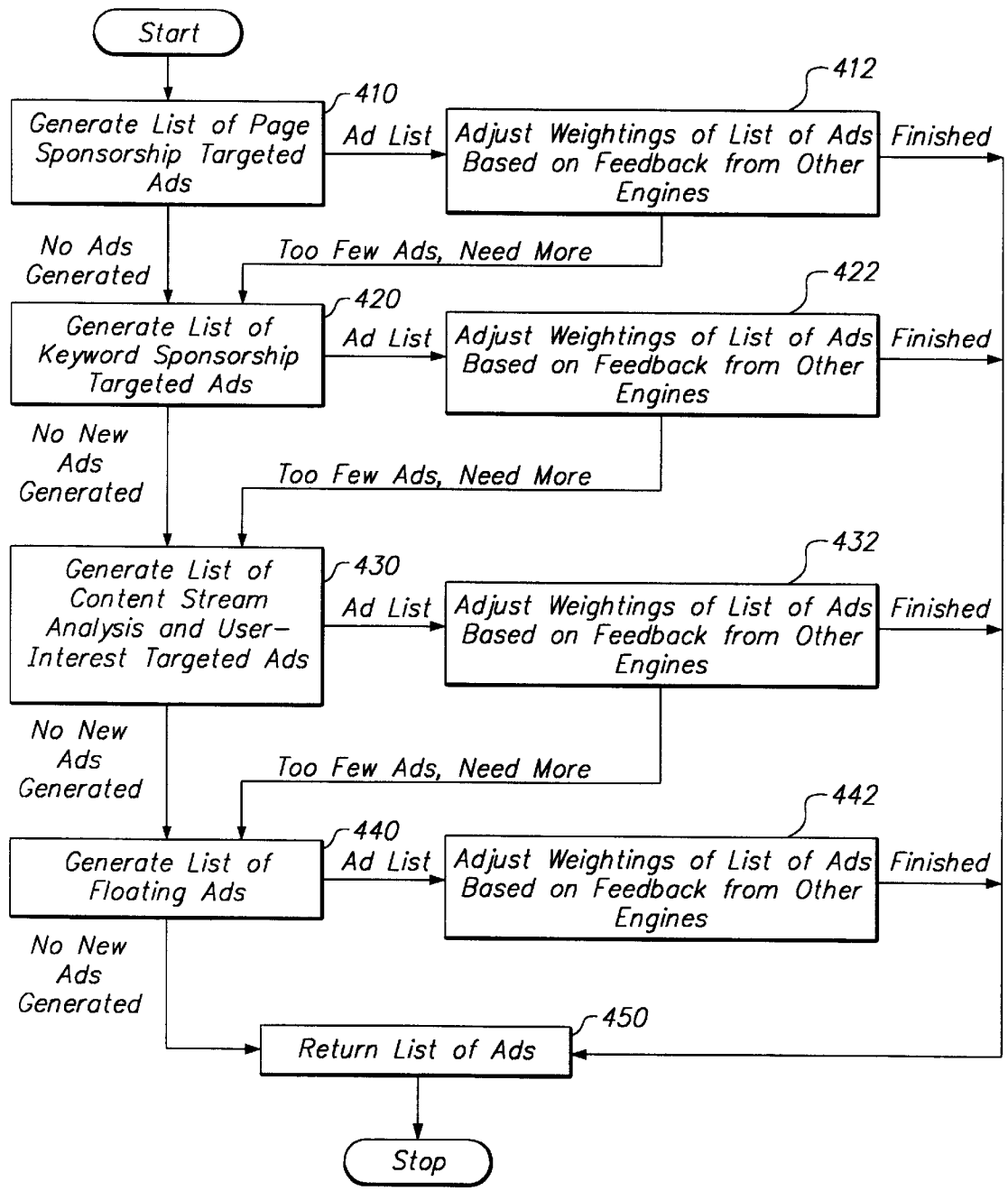
FIG. 4 illustrates an example of using a number of affinity engines to generate a list of advertisements.

FIG. 4 illustrates an example of using a number of affinity engines to generate a list of advertisements. This example represents the details of how ad selections are made in one embodiment of the ad server 100.

The ad server 100, using the ad exec program 101, sequences the running of affinity engines and the combining of evidence. The ad exec program 101 works by successively generating and pruning lists of advertisements.

At each generation block in the flow chart, a list of potential ads is determined based on the user-profile information passed to the engine. For example, at block 410, block 420, and block 430, page sponsor advertisements, key word sponsor advertisements, and content stream and/or user interest advertisements, respectively, are found. The block 410 passes its generated list through the corresponding weighting block 412. The weighting block 412 adjusts the weights of advertisements found by the block 410. Similar blocks 422 and 432 exist. Note that in one embodiment, block 420 will not be executed if a sufficient number of advertisements are found in block 410 (after the weights are applied).

Then the weights may be adjusted by passing the prospective advertisements through the remaining targeting engines (block 440) to handle the following targeting characteristics:

Ad Schedule
Demographics
Browser, OS, and Hardware Platform
User Impression Freshness
Geographic
Inventory Levels At block 450, the list of ads is returned. This list can then be used by the ad server 100 to provide the web server 160 with the appropriate number of ads.

The following are the important details to note concerning this example.

There is an implicit prioritization among the different ways to target ads. Specifically, page sponsorship ads take priority over keyword sponsorship ads, which take priority over content-stream and user-interest targeted ads, which in turn take priority over floating ads.

Ads whose sole targeting information is based on demographics, browser information, or geographic location are treated as floating ads.

If an ad is selected based on both content-stream targeting and user-interest targeting, then the evidence scores are combined in an additive manner. Thus, an ad which satisfies both targeting methods will likely have a higher score than an ad which satisfies only one.

Demographics targeting is not additive. If an ad is demographically targeted and the user's demographic match scores zero, then the ad will be eliminated from the list of prospective ads.

Geographic targeting is not additive. If an ad is geographically targeted and the user's geographic location scores zero, then the ad will be eliminated from the list of prospective ads.

Browser information targeting is not additive. If an ad is targeted based on browser type, OS type, or hardware platform and the user's platform scores zero, then the ad will be eliminated from the list of prospective ads.

Additionally, demographic targeting matches using several distinct elements (e.g., age, martial status, gender, etc.). When computing the relevance score for a demographic match, each element has a positive score or the resulting score will be zero. For example, an ad which targets married males will score zero for an unmarried male or for an unmarried person of unknown gender.

Browser information targeting matches using three distinct elements, namely, browser type, OS, and domain name. When computing the relevance score for a browser information match, each element has a positive score or the resulting score will be zero. For example, an ad which targets Netscape browsers and the MacOS platform will not match a user who is running the Internet Explorer browser on MacOS.

User interest targeting is done using an implicit "or" semantics. This means the user interest engine works differently from the above two engines. For example, an ad which has both "golfers" and "swimmers" selected for user interest targeting will match a person whose interest is either golfing or swimming or both.

D. Conclusions

An expandable system and method for efficiently selecting and providing information such as advertisements has been described using some exemplary embodiments. However, the above description is not meant to limit the scope of the invention. The invention is defined by the scope of the claims.

What is claimed is:

1. A method of providing information using a computer system, the method comprising:

receiving a request for a dynamically generated display of information, the request being associated with request information, the request information helping characterize a user;

requesting one or more advertisements for use in generating the dynamically generated display of information;

generating a subset of advertisements from a set of advertisements using selection criteria, the subset of advertisements including the one or more advertisements, the selection criteria corresponding to the request information, the generating the set of advertisements including accessing one or more programs, each program of the one or more programs for adding to and refining the subset of advertisements using the selection criteria;

providing at least a reference to the one or more advertisements from the subset of advertisements upon the earlier occurrence of, the completion of all of the one or more programs adding to and refining the subset, a determination that the one or more advertisements is to be provided prior to the completion;

providing a description of the dynamically generated display of information, the description corresponding to the reference; and displaying the dynamically generated display of information using the description, the dynamically generated display including the one or more advertisements.

2. The method of claim 1 wherein receiving the request includes receiving an HTTP request for a browser program for an HTML page, the HTML page corresponding to the description.

3. The method of claim 1 wherein the computer system includes a client computer and a first server, the client computer and the first server being coupled in communications, wherein the method includes the client computer initiating the request, and wherein the first server receiving the request includes receiving the request at the first server.

4. The method of claim 3 wherein the computer system includes a second server, the second server being coupled in communications with the first server, and wherein requesting the one or more advertisements includes the first server requesting the one or more advertisements from the second server, and wherein providing the at least the reference includes the second server providing the reference to the first server.

5. The method of claim 1 wherein the generating the subset of advertisements includes accessing a first program of the one or more programs, the first program initializing the subset of advertisements prior to refining the subset of advertisements.

6. The method of claim 1 wherein each advertisement in the subset of advertisements is associated with a weighting indicating an affinity of the each advertisement to the selection criteria, wherein the one or more programs provide feedback about the number of advertisements being added to the subset of advertisements by a corresponding program, and wherein refining the subset of advertisements includes adjusting weightings of advertisements in the subset of advertisements according to feedback to adjust the number of advertisements added to the subset by a program of the one or more programs.

7. The method of claim 1 wherein the request information is used to identify a sponsor for the dynamically generated display of information, and wherein the one or more programs includes a program for identifying a set of sponsor advertisements of the set of advertisements, the set of sponsor advertisements corresponding to advertisements of the sponsor.

8. The method of claim 7 wherein the sponsor related information includes a sponsor identifier.

9. The method of claim 1 wherein the request information is used to identify a sponsor for a keyword, the keyword being associated with the dynamically generated display of information, the one or more programs includes a program for identifying a set of sponsor advertisements of the set of advertisements, the set of sponsor advertisements corresponding to advertisements of the sponsor.

10. The method of claim 1 wherein the request information is used to identify a sponsor for a keyword corresponding to the dynamically generated display of information, and wherein the one or more programs includes a program for identifying a set of sponsor advertisements of the set of advertisements, the set of sponsor advertisements corresponding to advertisements of the sponsor.

11. The method of claim 1 further comprising receiving a portion of the description, and wherein a program of the one or more programs analyzes the portion of the description to determine a set of terms identifying the portion of the description, wherein each advertisement in the set of advertisements is associated with a corresponding set of advertisement terms identifying the each advertisement, and wherein the program matches the set of terms with the sets of advertisement terms to adjust the subset of advertisements.

12. The method of claim 1 wherein the request information includes user interest information and wherein the one or more programs includes a program that adjusts the subset of advertisements by identifying a second subset of advertisements having some affinity to the user interest information and including the second subset of advertisements in the subset of advertisements.

13. The method of claim 1 wherein the computer system includes a server and wherein providing the description includes the server sending an HTML page with references to the one or more advertisements.

14. The method of claim 1 wherein the computer system includes a computer executing a display program, and wherein displaying the dynamically generated display of information includes the display program requesting the one or more advertisements and displaying a result of the request.

15. The method of claim 14 wherein the computer system includes a server, wherein the reference includes a link identifier to the server, the link identifier further identifying at least a first advertisement of the one or more advertisements, and wherein the display program uses the link identifier to request the first advertisement from the server.

16. A computer program product comprising:
 a computer usable medium having a computer readable program code embodied therein for causing a computer system to select and provide advertisements, the computer readable program code including,
 one or more computer readable select program codes that have selection criterion inputs and sets of advertisements outputs, the selection criterion inputs allow the one or more computer readable select program codes to select advertisements to include in the sets of advertisements outputs;
 a computer readable control program code that has advertisement request inputs and advertisement reference outputs, the computer readable program control program code generating a final set of advertisements from the sets of advertisements outputs, the advertisement request inputs corresponding to one or more requests for advertisements and one or more corresponding selection informations, the selection informations corresponding to the selection criterion inputs, the advertisement reference outputs referencing the final set of advertisements in response to the one or more requests for advertisements; and
 a computer readable access program code that accesses a store of advertisements in response to the one or more computer readable select program codes.

17. The computer program product of claim 16 wherein advertisements in the store of advertisements are associated with advertisement information, the one or more computer readable select program codes corresponding to one or more affinity engines, each affinity engine of the one or more affinity engines determining a corresponding set of advertisements by comparing the selection criterion inputs with the advertisement information and including advertisements with some affinity between the selection criterion inputs and the advertisement information.

18. The computer program product of claim 16 wherein the advertisement request inputs correspond to requests form a web server for advertisements and wherein the selection information includes user identifying information.

19. The computer program product of claim 18 wherein the user identifying information includes a username, a session identifier, an address of a requesting machine.

20. The computer program product of claim 16 wherein the store of advertisements includes a database program and wherein the computer readable access program code includes a data access module for accessing said database program.

* * * * *